US006970953B2

(12) United States Patent
Gregory et al.

(10) Patent No.: US 6,970,953 B2
(45) Date of Patent: Nov. 29, 2005

(54) SYSTEM AND METHOD FOR TERMINATING A BUS

(75) Inventors: Paul E. Gregory, Boise, ID (US); Ricardo Osuna, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 406 days.

(21) Appl. No.: 10/039,106

(22) Filed: Jan. 4, 2002

(65) Prior Publication Data

US 2003/0131159 A1 Jul. 10, 2003

(51) Int. Cl.⁷ .............................................. G06F 3/00
(52) U.S. Cl. ......................................... 710/15; 710/32
(58) Field of Search ............................ 710/15, 32, 62, 710/200, 300, 104, 106

(56) References Cited

U.S. PATENT DOCUMENTS 5,570,037 A * 10/1996 Llorens ........................ 326/30
6,115,831 A * 9/2000 Hanf et al. .................... 714/43
6,522,165 B2 * 2/2003 Ramachandran et al. ..... 326/30
6,587,968 B1 * 7/2003 Leyva ........................... 714/43

\* cited by examiner

*Primary Examiner*—Jeffrey Gaffin
*Assistant Examiner*—Harold Kim

(57) ABSTRACT

An exemplary system includes a bus (such as CAN bus) having at least two end points. A first and/or a second set of an undetermined number of devices may be connected to the bus. A controller is also connected to the bus, and is configured to establish a termination of the bus at one of the end points relative to the first and second sets of devices, dependent upon whether the controller receives a reply message in response to a communication test message sent to the first and second sets of devices at different times. If the controller discovers that devices are connected to the bus in both sets, the controller is relieved of establishing an end point on either end of the bus. Otherwise, if the controller discovers that devices are only connected to the bus in one of the two sets, the controller is therefore, configured to terminate an end of the bus.

7 Claims, 4 Drawing Sheets

SYSTEM AND METHOD FOR TERMINATING A BUS

TECHNICAL FIELD

The present invention is related to bus networks, and more particularly, to Controller Area Networks (CAN).

BACKGROUND

A bus network is generally the simplest type of network that consists of a communication line having two end points and zero or more intermediate stubs. Any number of devices may be connected to the communication line. One popular bus network is a Controller Area Network (CAN), developed by Bosch GmbH for the automobile applications in the 1980s. The CAN specification requires that the last two devices at the end points of a bus have termination resistors. These termination resistors are required to ensure proper communication between two or more devices connected to the CAN. In most automobile applications, the end points of the CAN bus are fixed. Additionally, most devices attached to the CAN bus in an automobile environment, such as headlights, dashboard and so forth, are pre-wired.

The CAN protocol has now been adopted to a wide variety of applications. CAN technology is used in some peripheral computer devices, such as printers. The CAN bus may be used to attach optional input and output devices to the printer, such as automated paper trays, bin sorters and many other related input/output devices.

Unlike the devices deployed in most automobile environments, optional input/output devices used in connection with printers are not fixed. That is, such optional devices may be installed and removed from the CAN on a frequent basis. In the case of printers, it is possible for users to install or remove optional paper handling devices. Each time a device is added or removed from the printer, it is possible that the endpoints of the CAN bus may have changed, and hence, termination of the CAN bus must be adjusted to reflect the addition or deletion of a device.

In a non-fixed swappable environment, most optional devices when installed on a CAN must have enough intelligence to determine whether or not they are located on the end-point of a CAN bus. If such an intelligent device, determines that it is located on an end-point, then the device must deploy a termination resistor (i.e., terminate the bus), in accordance with the CAN protocol. Some devices today, use other schemes such as current monitoring on an extra "Power On" line to determine if other devices exist on a CAN bus. So, in cases where optional devices might be connected to the bus, detection of these devices is accomplished by monitoring when a downstream device is turned-on and drawing power.

In cases where optional devices can be plugged-in and out of a printer, on both the input and output sides of the printer, it is common for printers to use two currents sensors to monitor for downstream devices: one sensor for monitoring the input side of the bus and the sensor for monitoring the output side. Using current sensors circuits, however, to detect power consumption on different branches (input/output) of a bus is expensive in terms of design time, cost of hardware elements and customization per product.

SUMMARY

A system and method of terminating a bus. In one implementation, an exemplary system includes a CAN bus having at least two end points. A first and/or a second set of an undetermined number of devices may be connected to the bus. A controller is also connected to the bus, and is configured to terminate the bus at one of the end points relative to the first or second sets of devices, if the controller receives a reply message from the first or second set of devices in response to a communication test message initially sent by the controller.

The exemplary system, therefore, introduces the broad concept of using a controller device to discover end points of a bus by sending test messages to two distinct sets of potential devices connected to the bus. If reply messages are received from both sets each time, then the controller has discovered that it is not located on an end point and there is no need for the controller to connect a termination resistor to the bus. On the other hand, if a reply message is observed from only one set of potential device(s), then the controller has discovered that it is located on an endpoint of the bus and the controller terminates its end of the bus (i.e., opposite the set of potential device(s) that replied to the controller). Additionally, the controller can instruct each subsequent device to verify it is the last device in the chain in order to have the subsequent device set its termination resistor when appropriate.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Figure 1:
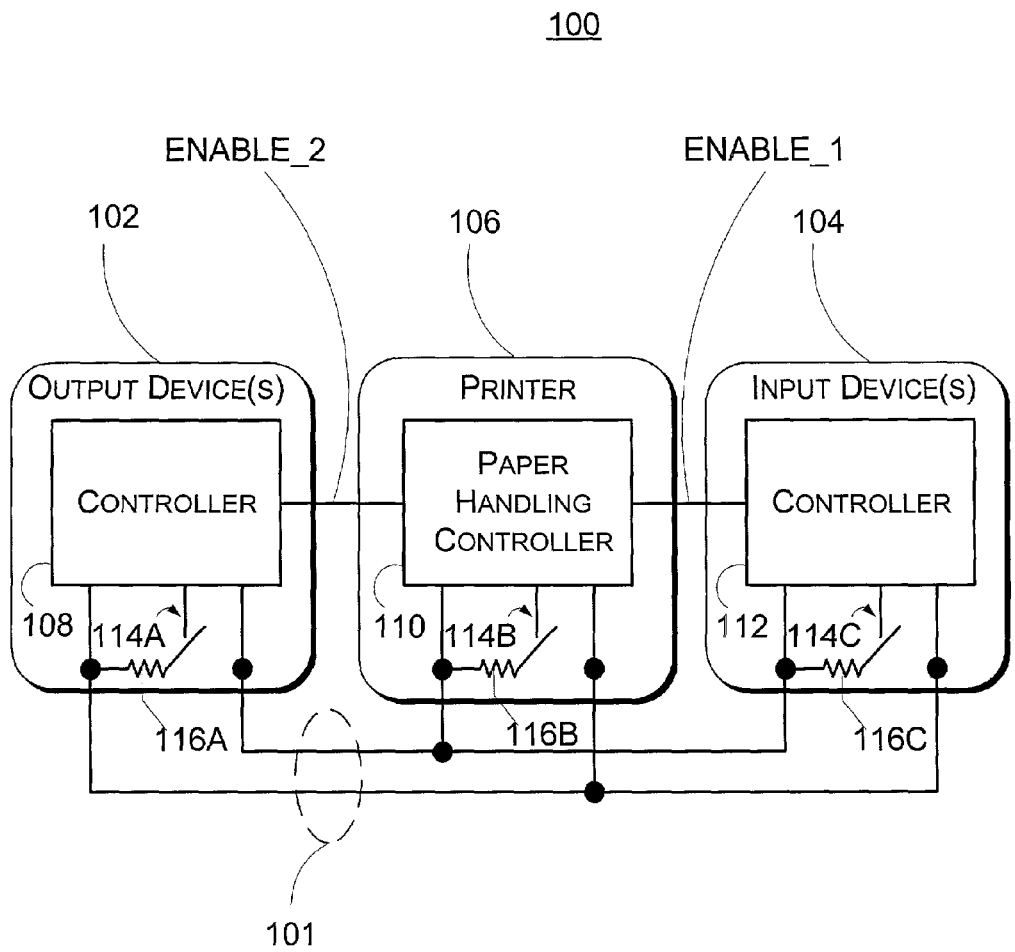
FIG. 1 is a block diagram of an exemplary system used in a printer environment.

FIG. 1 is a block diagram of an exemplary system 100. System 100 includes a bus 101. In the exemplary implementation, bus 101 is a two wire CAN bus that functions in accordance with the CAN specification, Version 2.0B (ISO11898), Robert Bosch GmbH, the entire contents of which are incorporated herein by reference. Nevertheless, it is possible that the principles described in relation to the exemplary CAN bus 101 may be adapted for alternative communication protocols and serial busses, such as the Motorola Interconnect Bus, or other wire busses developed hereafter. Other topologies are possible for bus 101 such as a daisy chain topology with each individual bus controlled by an agent.

System 100 further includes optional output devices 102, optional input devices 104, and a printer 106. Each of these devices 102, 104 and 106 further include intelligent controllers: controller 108, Paper Handling Controller (PHC) 110 and controller 112, respectively. As shall be become more apparent from the description below, printer 106 serves as a central controller in the operation of system 100.

Exemplary sets of optional printer output and input devices 102, 104 may include any of the following devices: sheet feeders, envelope feeders, multiple output bins, stackers, booklet makers, job separators, staplers, binders, hole punchers, collators, stampers and any other related devices. Of course, the aforementioned list is not exhaustive and as is appreciated by those skilled in the art a myriad of other devices could be substituted for the set of input/output devices described in the exemplary illustration including non-printing devices as described below.

As used herein, "printer," "printer device" or the like, means any electronic device having data communications, data storage capabilities, and/or functions to render printed characters and images on a print media. A printer device may be a printer, fax machine, copier, plotter, and the like. The term "printer" includes any type of printing device using a transferred imaging medium, such as ejected ink, to create an image on a print media. Examples of such a printer can include, but are not limited to, laser printers, inkjet printers, plotters, portable printing devices, as well as multi-function combination devices. Although specific examples may refer to these printers, such examples are not meant to limit the scope of the claims or the description, but are meant to provide a specific understanding of the described implementations.

Furthermore, while the illustrated implementation refers to devices used in a printing environment, those skilled in the pertinent art will readily realize that non-printing devices could alternatively be employed in other environments, such as automobiles, boating and other CAN environments. For instance, in an automobile environment, optional output devices 102 may include headlights, stereo and security system. In place of a printer 106, may be an automobile central processor, whereas input devices 104 may include mobile telephones and navigational devices. In any event, the applicable devices 102–106 would correlate to the environment in which they are deployed, and the controllers 108–112 would be some type of intelligent device capable of performing CAN protocol communications or the like (see for instance FIG. 4 below).

Referring back to FIG. 1, a single output/input device 102, 104 is shown in FIG. 1 to simplify the illustration of system 100. It should be appreciated that in a printer environment, any number of output/input devices may be installed on the bus 101. For instance, printer 106 could have (i) no devices plugged-in on either its input or output branches (for purposes of illustration, a branch refers to anything to the right or left of printer 106 that is connected to bus 101), (ii) input device(s) attached to bus 101 and nothing else; (iii) output device(s) connected to bus 101 and nothing else; and (iv) both input and output device(s) connected to bus 101.

In the case where printer 106 is the only device connected to bus 101, there is no communication on bus 101. This is a null condition because there are no endpoints to bus 101 other than printer 106.

In the case where an optional input device 104 is attached to printer 106 and no output devices 102, then printer 106 forms one end of bus 101 and the input device 104 forms the other. If additional input devices are connected to bus 101, then printer 106 remains an end point of bus 101.

The same holds true where an optional output device 102 is attached to printer 106 and no input devices 104, then printer 106 forms one end of bus 101, and the output device 102 forms the other. In this case, it does not matter, whether additional output devices 102 are connected to bus 101 (to the left of printer 106), because printer 106 remains an endpoint on bus 101 whether there are more than one output device 102 or not.

In the case where there are both output/input device(s) 102, 104 connected on both sides (branches) of printer 106 on bus 101, then the output device(s) 102 and input device(s) 104 forms an end point of bus 101. In this scenario, printer 106 is not located on an endpoint of bus 101 and therefore, printer 106 does not terminate bus 101.

Printer 106 through its paper handling controller (PHC) 110 determines where the endpoints are on the bus 101 and ensures proper termination. PHC 110 sometimes referred to as the formatter of the printer, serves as central controller for printer 106. Controllers 108 and 112 determine whether they are located on an endpoint of bus 101 and ensure proper termination. In order to assure proper termination at all times, enabling devices disconnect their termination resistor when enabling the next device in the chain and the most recently enabled device connects its termination resistor before any communication is attempted. The last device in the chain (input or output branch) reconnects its termination resistor after determining that no more devices are present.

"Terminate" means that a device 102, 104 and/or 106, located at the end of bus 101, connect termination resistors 116A–C in parallel with the devices. This is accomplished by controllers 108–112 sending actuation signals (not shown) to their respective switches 114A–C, to either connect or disconnect their resistors 116A–C in parallel with their respective devices 102–106. This is also referred to as activating a termination load across a controller device, where the termination load is a resistor or any other equivalent resistant devices. Those skilled in the art are familiar with the operation of switches, resistors and components (such as filters) that provide equivalent circuit characteristics to resistors.

Figure 2:
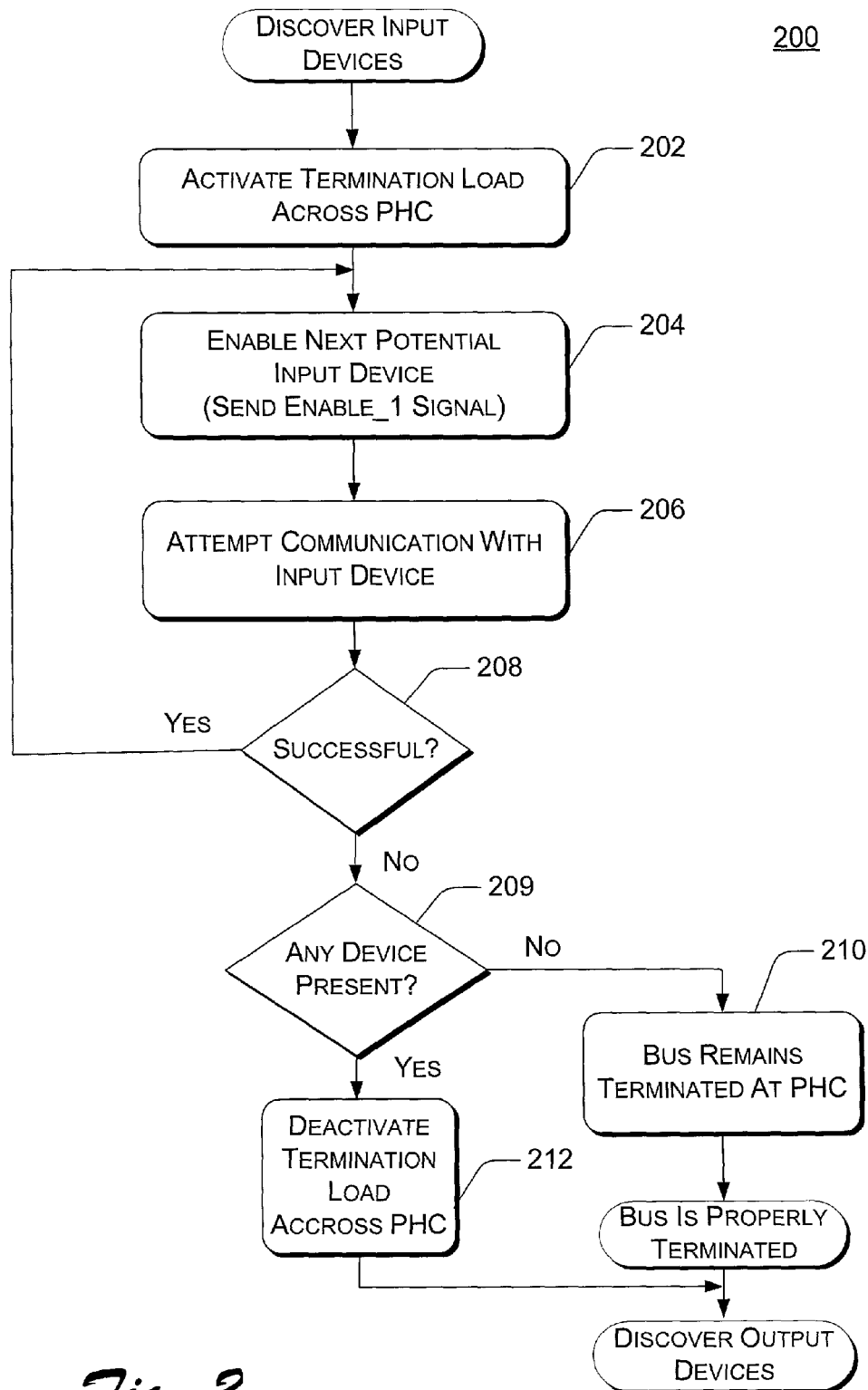
FIG. 2 is a flow chart illustrating an exemplary method for a controller to discover input devices on a bus and properly terminate the bus accordingly.
Figure 3:
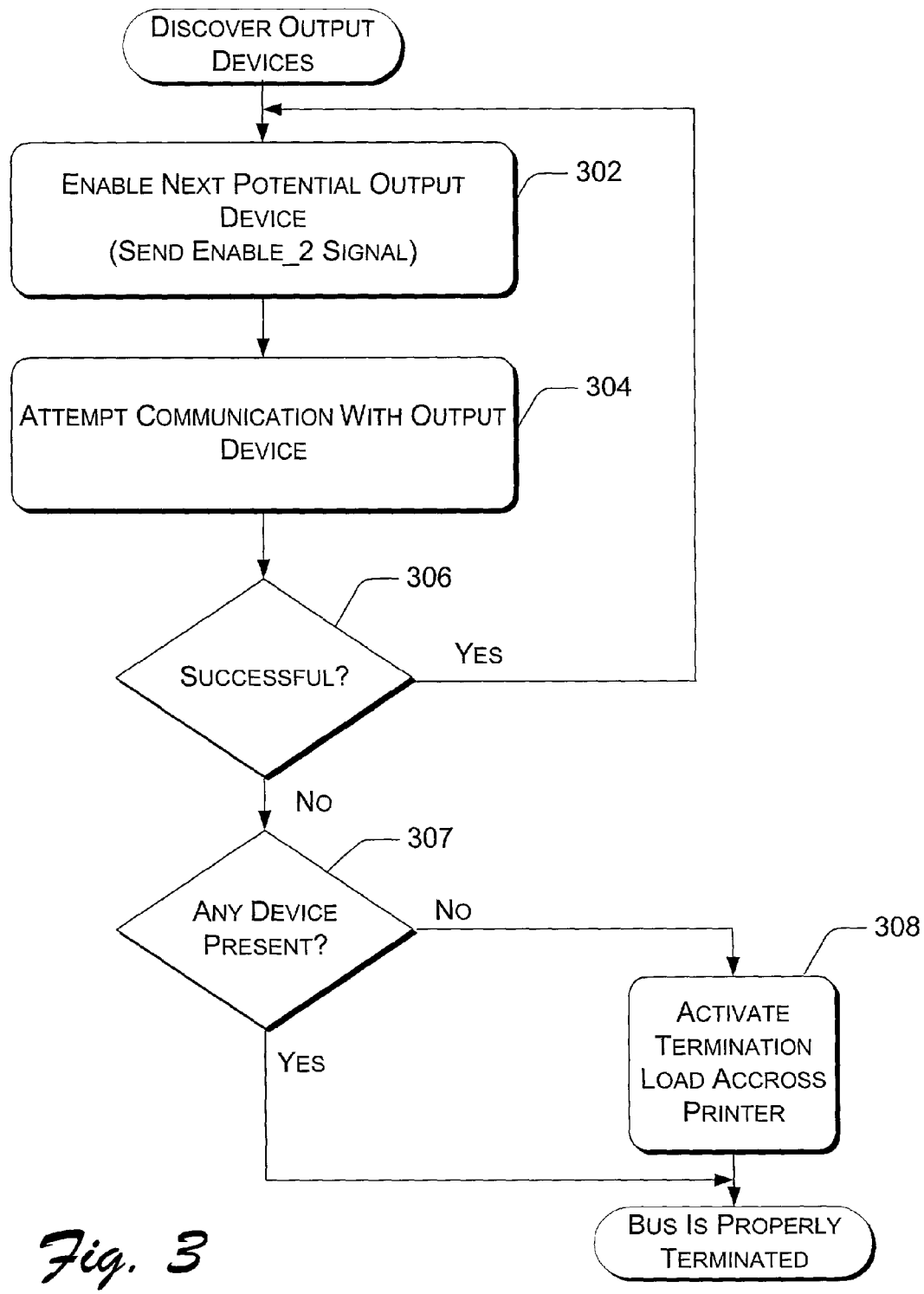
FIG. 3 is a flow chart of an exemplary method for a controller to discover output devices on a bus and properly terminate the bus accordingly.

The operation of the exemplary system 100, will now be described with reference to the flow charts of FIGS. 2 and 3. Referring initially to FIG. 2 is a flow chart illustrating an exemplary method 200 for PHC 110 to discover input devices 104 on bus 101 and properly terminate bus 101 accordingly. The method 200 is performed by software loaded into PHC 110. Nevertheless, method 200 could be performed in any combination of hardware, firmware and software. Method 200 includes: exemplary operational steps 202–212. Prior to initiating method 200, it is assumed that printer 106 is powered-on.

In step 202, PHC 110 activates a termination load 116B across printer 106. That is, PHC 110 closes switch 114B thereby connecting resistor 116B in parallel with PHC 110. At this point, bus 101 is terminated at the PHC 110 end of bus 101.

In step 204, PHC 110 enables the first of a set of potential input devices 104. PHC 110 sends ENABLE_1 signal the first potential input device 104 on the input side (branch) of printer 106 via a separate wire labeled as ENABLE_1. If an input device 104 is present, it will enable and terminate its end of bus 101 by closing switch 114C. At this point, all devices connected to the output branch of bus 101 (left side of printer 106) are inactive.

When the Enable_1 signal is implemented in a daisy chain form, PHC 110 is typically the first device to assert the Enable_1 signal. To sense any further input devices, however, the last device to be enabled via the Enable_1 signal, asserts its own Enable_1 signal to discover if other devices on bus 101 exist. One way to accomplish this signal structure is instruct PHC 110 to command each subsequent sensed input device 104 to assert its Enable_1 signal to discover a next input device. Other schemes such as time device sensing could be used.

Next in step 206, PHC 110 attempts to determine if an input device exists on bus 101. PHC 110 attempts to establish communication with a potential input device 104 by sending a test message (not shown) on bus 101. If an input device 104 is present on bus 101, such input device 104 should send a reply message (not shown) to PHC 110 (note that this message exchange order can by reversed). At this point, PHC 110 knows whether a device exists on the input branch (to the right of printer 106). Test messages are actually binary configuration commands sent by PHC 110 according to the CAN protocol. Whereas reply message are responses to the configuration commands by either input/output devices.

So, if PHC 110 was successful in establishing communication with an input device (i.e., PHC 110 received at a reply message), then according to the YES branch of decisional block 208, PHC 110 proceeds to determine if more input devices 104 are present by returning to step 204. This process is repeated until the last device in the input branch is found or as shown in decisional step 209 there is an unsuccessful attempt to establish communication an input device 104.

Next in decisional step 209, PHC 110 determines whether to maintain or remove termination resistor 116B based on whether any device was located in the input branch of bus 101. According to the YES branch of decisional step 209, if PHC 110 was successful, then PHC 110 disconnects resistor 116B from it parallel electrical connection to PHC 110, pursuant to step 212. That is, PHC 110 switch 114B opens disconnecting resistor 116B from its parallel electrical connection to PHC 110. If no input device was present as indicated by the NO branch of decisional step 209, then PHC 110 maintains termination resistor 116B in parallel electrical connection to PHC 110. Thus, bus 101 remains terminated at PHC 110. At this point, the bus is properly terminated by a process of elimination. PHC 110 must be located on an end point of bus 101, whether or not output devices 102 are connected to bus 101 (if there were no devices present according to step 209).

To ascertain where the other end point is on bus 101, PHC 110 must discover if any potential output devices exists. Referring to FIG. 3 is a flow chart showing an exemplary method 300 for printer 106 to discover output devices 102 on bus 101 and properly terminate bus 101 accordingly. Method 300 includes steps 302–308.

In step 302, PHC 110 enables a potential output device 102. That is, PHC 110 sends an ENABLE_2 signal to the first potential output devices 102 located on the output side (branch) of printer 106 via a separate wire labeled as ENABLE_2. If an output device 104 is present, it will turn-on and terminate its end of bus 101 by closing switch 114A.

Next in step 304, PHC 110 attempts to determine if an output device exists on bus 101. PHC 110 attempts to establish communication with the first potential output device 102 by sending a test message (not shown) on bus 101. If an output device 102 is present on bus 101, such output device 102 should send a reply message (not shown) to PHC 110 (this message order can be reversed). At this point, PHC 110 knows whether other output device(s) exist on the output branch (to the left of printer 106). Then according to decisional step 306, PHC 110 then repeats steps 302–306 until the last possible device connected to the output side of bus 101 is discovered, (in a similar fashion as described with reference to step 208 of FIG. 2 and input devices).

At a point when PHC 110 is not successful in establishing communication with an output device 102 (i.e., no reply message was received by PHC 110), then according to the "NO" branch of decisional block 306, PHC 110 determines if at least one output device is present in system 100 as indicated by decisional step 307. According to the NO branch of decisional step 307, if no output device 102 is present bus 101 is terminated at PHC 110. That is, in step 308, switch 114B is reactivated (closing switch 114B) causing bus 101 to be terminated with a load across PHC 110. On the other hand, if at least one output device 102 is present on bus 101, then a termination resistor 116A is provided by that last device on the output branch of bus 101. At this point bus 101 is properly terminated.

Figure 4:
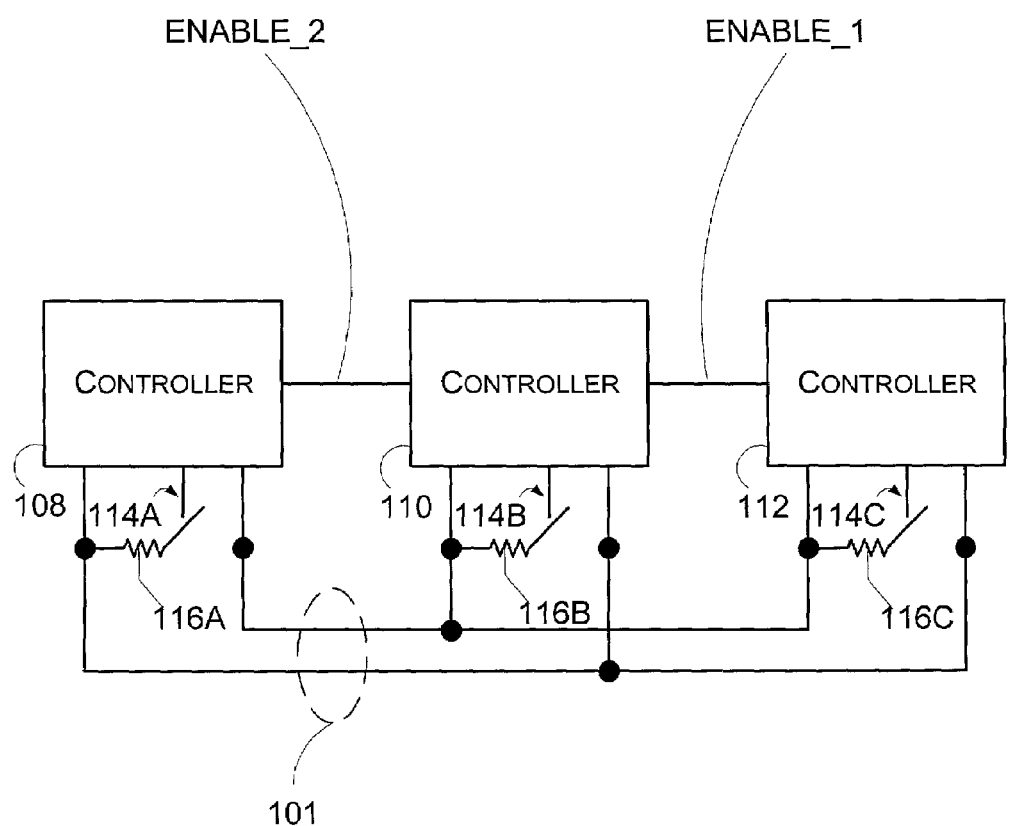
FIG. 4 is a block diagram of an exemplary generic system for terminating a bus.

FIG. 4 is a block diagram of an exemplary generic system 400 for terminating a bus. Exemplary system 400 includes a CAN bus 101 having at least two end points. A first and/or a second set 108, 112 of an undetermined number of devices may be connected to bus 101. A central controller 110 is also connected to the bus 101, and is configured to terminate the bus 101 at one of the end points relative to the first or second sets of devices 108,112, if the central controller 110 receives a reply message from the first or second set of devices 108, 112 in response to a communication test message initially sent by the central controller 110. It should be noted that while only a single box is shown for controllers 108 and 112, they are meant to represent one or several devices connected to bus 101. The operational steps of FIGS. 2 and 3 would apply to the generic system 400 of FIG. 4, except specific references to printer terminology would need to be adapted to the specific generic application.

Thus, although some preferred implementations of the various methods and arrangements of the present invention have been illustrated in the accompanying Drawings and described in the foregoing Detailed Description, it will be understood that the invention is not limited to the exemplary aspects disclosed, but is capable of numerous rearrangements, modifications and substitutions without departing from the spirit of the invention as set forth and defined by the following claims.

What is claimed is:

1. A method of terminating a bus comprising:
activating a termination load across a controller device;
enabling a first set of potential devices connected to said bus;
attempting to establish communication with any of said first set of potential devices;
deactivating said termination load across said controller device, if communication is established between said controller and at least one of said potential devices in said first set of potential devices;
enabling a second set of potential devices connected to said bus;
attempting to establish communication with any of said second set of potential devices; and
reactivating said termination load across said controller device, if communication is not established between said controller and at least one of said potential devices in said second set of devices.

2. The method as recited in claim 1, further comprising: leaving enabled said first set of potential devices while attempting to establish communication with any of said second set of potential devices.

3. The method as recited in claim 1, wherein said termination load is a resistor coupled in parallel to said controller and is activated and deactivated by a switch controlled by said controller.

4. The method as recited in claim 1, wherein said bus is a CAN bus.

5. The method as recited in claim 1, wherein said controller is a paper handling controller for a printer device.

6. The method as recited in claim 1, wherein said first set of potential devices includes at least one paper handling device.

7. The method as recited in claim 1, wherein said second set of potential devices includes at least one paper handling device.

* * * * *